United States Patent
Allen et al.

(10) Patent No.: US 9,553,363 B2
(45) Date of Patent: Jan. 24, 2017

(54) ANTENNA ARRAY OPTIMIZATION SYSTEM

(71) Applicant: The Boeing Company, Chicago, IL (US)

(72) Inventors: David L. Allen, Thousand Oaks, CA (US); Gavin D. Holland, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 281 days.

(21) Appl. No.: 14/313,065

(22) Filed: Jun. 24, 2014

(65) Prior Publication Data
US 2015/0372381 A1  Dec. 24, 2015

(51) Int. Cl.
| | |
|---|---|
| G01S 1/08 | (2006.01) |
| H01Q 3/26 | (2006.01) |
| H01Q 3/34 | (2006.01) |
| H04B 17/17 | (2015.01) |

(52) U.S. Cl.
CPC ............. *H01Q 3/267* (2013.01); *H01Q 3/34* (2013.01); *H04B 17/17* (2015.01)

(58) Field of Classification Search
CPC ............ H01Q 3/00; H01Q 3/267; H01Q 3/34; H04B 17/17
USPC .................................................. 342/368, 377
See application file for complete search history.

(56) References Cited

U.S. PATENT DOCUMENTS

| | | | | |
|---|---|---|---|---|
| 5,072,228 A | * | 12/1991 | Kuwahara | H01Q 3/267 342/360 |
| 5,416,489 A | * | 5/1995 | Mailloux | H01Q 3/267 342/173 |
| 6,140,976 A | | 10/2000 | Locke et al. | |
| 6,339,398 B1 | * | 1/2002 | Redvik | H01Q 3/267 342/368 |
| 2002/0093453 A1 | * | 7/2002 | Vail | H01Q 1/38 342/372 |
| 2010/0033375 A1 | * | 2/2010 | Mason | H01Q 3/267 342/372 |

OTHER PUBLICATIONS

Extended European Search Report, dated Oct. 9, 2015, regarding Application No. EP15171378.1, 8 pages.
Mitilineos et al., "On Array Failure Mitigation with Respect to Probability of Failure, Using Constant Excitation Coefficients and a Genetic Algorithm," IEEE Antennas and Wireless Propagation Letters, vol. 5, No. 1, Dec. 2006, pp. 187-190.
Boeringer et al., "Particle Swarm Optimization Versus Genetic Algorithms for Phased Array Synthesis," IEEE Transactions on Antennas and Propagation, vol. 52, No. 3, Mar. 2004, pp. 771-779.
Hansen, "Phased Array Antennas,"John Wiley & Sons, Inc., Wiley Series in Microwave and Optical Engineering, Second Edition, copyright 2009, 58 pages.

(Continued)

*Primary Examiner* — Harry Liu
(74) *Attorney, Agent, or Firm* — Yee & Associates, P.C.

(57) ABSTRACT

A method for optimizing a phased array antenna. A predicted future health state for elements in the phased array antenna is identified. A configuration for the elements to use a radiation pattern based on the predicted future health state for the elements taking into account potential degradation of a group of the elements in the predicted future health state is also identified.

16 Claims, 9 Drawing Sheets

(56) References Cited

OTHER PUBLICATIONS

Joler, "Self-recoverable antenna arrays," The Institution of Engineering and Technology, IET Microwave, Antennas & Propagation, vol. 6, Issue 14, Feb. 2012, pp. 1608-1615.
Keizer, "Element Failure Correction for a Large Monopulse Phased Array Antenna With Active Amplitude Weighting," IEEE Transactions on Antennas and Propagation, vol. 55, No. 8, Aug. 2007, pp. 2211-2218.
Levitas et al., "Practical Failure Compensation in Active Phased Arrays," IEEE Transactions on Antennas and Propagation, vol. 47, No. 3, Mar. 1999, pp. 524-535.
Yeo et al., "Array Failure Correction with a Genetic Algorithm," IEEE Transactions on Antennas and Propagation, vol. 47, No. 5, May 1999, 823-828.
Yeo et al., "Adaptive Array Digital Beamforming Using Complex-Coded Particle Swarm Optimization—Genetic Algorithm," IEEE Asia-Pacific Microwave Conference, Dec. 2005, 3 pages.
Yeo et al., "Fast Array Failure Correction Using Improved Particle Swarm Optimization," Asia-Pacific Microwave Conference, Dec. 2009, pp. 1537-1540.
Walia et al., "Antenna Array Failure Correction using Optimization Techniques," International Journal of Advanced Research in Computer Science and Software Engineering, vol. 3, Issue 9, Sep. 2013, pp. 764-769.
Grewal et al., "A Linear Antenna Array Failure Correction Using Firefly Algorithm," Progress in Electromagnetics Research M, vol. 27, copyright 2012, pp. 241-254.
Khodier et al., "Linear and Circular Array Optimization: A Study Using Particle Swarm Intelligence," Progress in Electromagnetics Research B, vol. 15, copyright 2009, pp. 347-373.

\* cited by examiner

ANTENNA ARRAY OPTIMIZATION SYSTEM

BACKGROUND INFORMATION

1. Field

The present disclosure relates generally to antennas and, in particular, to phased array antennas. Still more particularly, the present disclosure relates to a method and apparatus for optimizing the transmission and reception of radiation by elements in a phased array antenna based on a predicted future health state for elements in the phased array antenna.

2. Background

Phased array antennas are used in many applications. For example, phased array antennas may be used for communications, detecting objects, tracking the movement of objects, and other suitable applications.

A phased array antenna has antenna elements electrically connected to at least one of a transmitter and a receiver. These antenna elements may be referred to as elements. An antenna element is an electrical device that converts electrical signals into electromagnetic radiation, and electromagnetic radiation into electrical signals. For example, a phased array antenna may be configured to convert electrical signals received from a transmitter into electromagnetic radiation for transmission. Further, an antenna may be configured to convert electromagnetic radiation received at the phased array antenna by the elements into electrical signals to be sent to a receiver.

In some cases, the amplitudes, phases, or both amplitudes and phases of the respective electrical signals being received at or sent from the different antenna elements in the antenna may be varied to change a radiation pattern of the antenna. The antenna elements may be referred to just as "elements." The radiation pattern of an antenna describes the directional dependence of the strength of the electromagnetic radiation transmitted by the antenna or the sensitivity of the antenna to electromagnetic radiation received by the antenna.

The different elements in a phased array antenna may degrade and may fail over time. As a result, the configuration for transmitting signals using the phased array antenna may vary from the desired pattern for a particular application. Consequently, the phased array antenna may not perform as desired during a mission.

Many of the platforms that carry a phased array antenna may not have the ability to detect the failure or degradation of elements in the phased array antenna. Additionally, many of these platforms also may not have the processing power to identify a new configuration during a mission if one or more elements failed during the course of the mission.

As a result, the mission may not provide a desired result. In some cases, the mission may be aborted, the phased array antenna may be reconfigured, and the mission restarted. Therefore, it would be desirable to have a method and apparatus that take into account at least some of the issues discussed above, as well as other possible issues.

SUMMARY

An embodiment of the present disclosure provides an apparatus comprising a phased array antenna optimizer. The phased array antenna optimizer is configured to identify a predicted future health state for elements in a phased array antenna. The phased array antenna optimizer is also configured to identify a configuration for the elements to use a radiation pattern based on the predicted future health state for the elements taking into account potential degradation of a group of elements.

In another illustrative embodiment, a phased array antenna comprises elements in the phased array antenna and a controller. The controller is configured to operate the elements to use a radiation pattern based on a predicted future health state for the elements taking into account a degradation of a group of the elements.

In yet another illustrative embodiment, a method for optimizing a phased array antenna is presented. A predicted future health state for elements in the phased array antenna is identified. A configuration for the elements to use a radiation pattern based on the predicted future health state for the elements taking into account potential degradation of a group of the elements in the predicted future health state is also identified.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
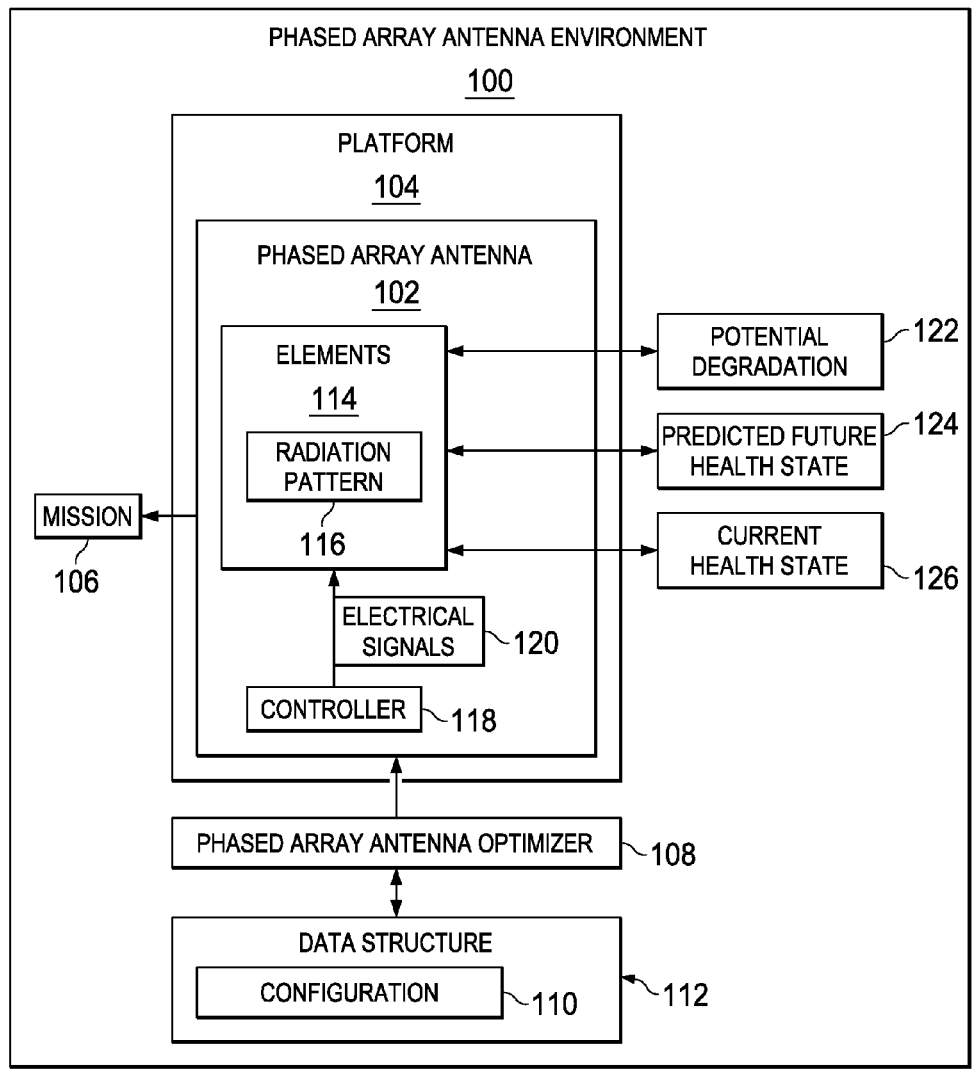
FIG. 1 is an illustration of a block diagram of a phased array antenna environment in accordance with an illustrative embodiment.

The illustrative embodiments recognize and take into account a number of different considerations. For example, the degradation of elements in a phased array antenna may be taken into account for when those degradations occur during the mission. The degradation of an element may include the failure of the element to transmit or receive radiation signals.

The illustrative embodiments recognize and take into account that the current health state, as well as the predicted future health state of the elements at a future point in time, may be used to configure the elements in the phased array antenna. The illustrative embodiments recognize and take into account that this type of configuration may lead to improved results from a mission as compared to currently used techniques.

Thus, the illustrative embodiments provide a method and apparatus for optimizing a phased array antenna. A predicted future health state for elements in the phased array of an antenna is identified. The elements are configured to use a radiation pattern based on the predicted future health state for the elements taking into account a potential degradation of a group of the elements that may potentially occur in the predicted future health state.

As used herein, a "group of" when used with reference to items means one or more items. For example, a group of elements is one or more elements.

By taking into consideration what elements may degrade, the optimization of the configuration for the elements may be performed entirely off-line. In other words, the illustrative embodiments recognize and take into account that this type of approach may be performed before a mission occurs. As a result, additional use of competition resources, sensors, or both are not required.

In the illustrative examples, optimization of a component means that components may be set, configured, manipulated, or otherwise changed to perform as close as possible to a desired level of performance. This desired performance may be the best performance that may be obtained for the components or some lower-level that is selected for the desired level of performance of the components. The component may be, for example, a phased array antenna, a software application, a process, a controller, an element, a system, or some other type of component for which optimization may be desired.

In the illustrative example, a platform carrying a phased array antenna does not need to be able to detect a degradation of the elements in the phase array antenna during the performance of the mission. In this manner, the weight, cost, complexity or some combination thereof for the phased array antenna, the platform, or both may be reduced.

The illustrative embodiments provide a method and apparatus for optimizing a phase array antenna. In one illustrative example, a predicted future health state for elements in the phased array antenna is identified. The elements are configured to use a radiation pattern based on the predicted future health state for the elements taking into account a potential degradation of a group of the elements. The configuration may optimize the phased array antenna for a mission that is to be performed at some point in time. The predicted future health state may be used to optimize the elements and may take into account the length of the mission.

With reference now to the figures and in particular with reference to FIG. 1, an illustration of a block diagram of a phased array antenna environment is depicted in accordance with an illustrative embodiment. In this illustrative example, phased array antenna environment 100 includes phased array antenna 102. Phased array antenna 102 may be located on platform 104 and may operate to perform mission 106.

In the illustrative example, platform 104 may take various forms. The platform may be, for example, a mobile platform, a stationary platform, a land-based structure, an aquatic-based structure, and a space-based structure. More specifically, the platform, may be an aircraft, surface ship, a tank, a personnel carrier, a train, a spacecraft, a space station, a satellite, a submarine, an automobile, a power plant, a bridge, a dam, a building, a missile, an unmanned aerial vehicle (UAV), a helicopter, and other suitable platforms.

In the illustrative example, mission 106 may have various directions. Mission 106 may be, for example, communications, detection, surveillance, or other types of missions.

In these illustrative examples, phased array antenna optimizer 108 generates configuration 110 for phased array antenna 102. Configuration 110 is used by phased array antenna 102 during operation, such as performance of mission 106. For example, phased array antenna optimizer 108 may generate data structure 112 containing configuration 110.

In particular, configuration 110 may be for the manner in which elements 114 in phased array antenna 102 uses radiation pattern 116. Radiation pattern 116 is a function of the location, magnitude, and phase of each of elements 114. As depicted, controller 118 receives data structure 112 containing configuration 110.

In this illustrative example, controller 118 controls the manner in which elements 114 generate radiation pattern 116 using configuration 110. For example, controller 118 controls the amplitude, phase, and other characteristics of electrical signals 120 sent to elements 114 to use radiation pattern 116.

Elements 114 use radiation pattern 116 to perform at least one generating radiation pattern 116 or receiving radiation pattern 116. As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In this illustrative example, at least one of one generating radiation pattern 116, receiving radiation pattern 116, or one generating radiation pattern 116 and receiving radiation pattern 116. In other words, elements 114 may be configured to perform any combination of generating or receiving radiation pattern 116.

In the illustrative example, in generating configuration 110, phased array antenna optimizer 108 takes into account that elements 114 in phased array antenna 102 may not operate as desired over time. In other words, a group of elements 114 may have potential degradation 122. For example, potential degradation 122 of one or more of the group of elements 114 may be a failure, reduction in performance or some combination thereof.

Thus, in this illustrative example, phased array antenna optimizer 108 identifies predicted future health state 124 for elements 114 in phased array antenna 102. Predicted future health state 124 is a health state for elements 114 that may occur at a future point in time. Predicted future health state 124 is in contrast to current health state 126 for elements 114 at the current point in time.

Phased array antenna optimizer 108 also identifies configuration 110 for elements 114 to use radiation pattern 116 based on predicted future health state 124 for elements 114 taking into account potential degradation 122 of a group of elements 114 in predicted future health state 124. In this example, the identification is performed by phased array antenna optimizer 108 creating configuration 110 and sending configuration 110 to controller 118 in this illustrative example.

Thus, elements 114 may be configured in a manner that provides improved performance over configurations for elements 114 that are based on current health state 126 for elements 114. For example, potential degradation 122 of the group of elements 114 during performance of mission 106 may result in reducing the quality of the results of mission 106. In some cases, mission 106 may be aborted, elements 114 may be reconfigured based on current health state 126 with potential degradation 122 of the group of elements 114, and then platform 104 with phased array antenna 102 may be sent to perform mission 106. For example, potential degradation 122 may result in an inability to detect objects, generate images of objects, exchange information, or perform other operations for mission 106.

With the use of predicted future health state 124, phased array antenna 102 may still be used to perform mission 106 in a manner that provides a desired level of performance even with potential degradation 122 of the group of elements 114. In this manner, elements 114 that are at risk of having potential degradation 122 during mission 106 may be taken into account to allow for mission 106 to be performed.

As a result, repairs, adjustments, or maintenance to elements 114 may be delayed or shifted to a more convenient time. Further, affordability and improvements of phased array antennas may occur because of a greater tolerance in performing mission 106 when potential degradation 122 of the group of elements 114 occurs.

Figure 2:
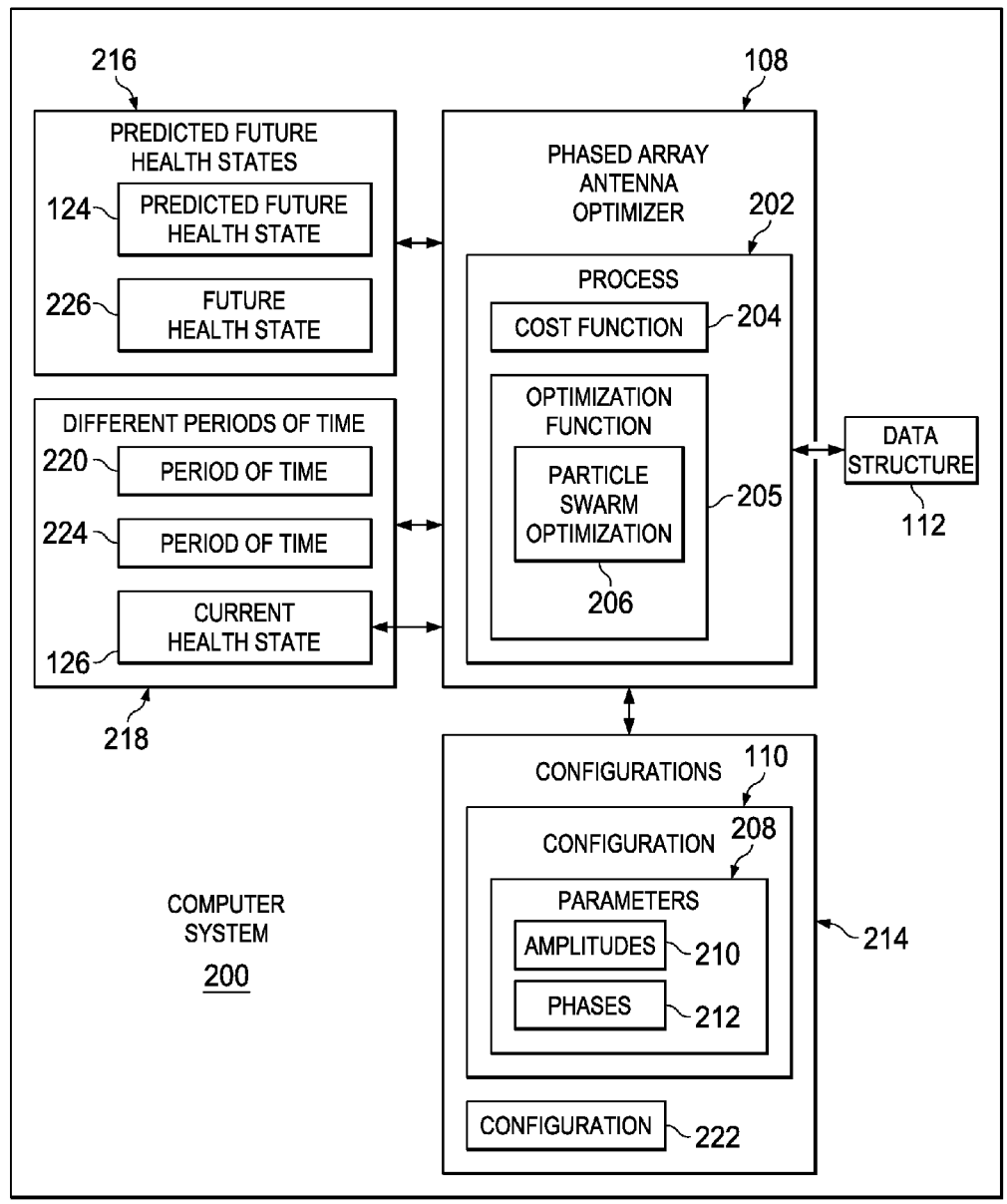
FIG. 2 is an illustration of data flow for configuring elements in a phased array antenna in the form of a block diagram in accordance with an illustrative embodiment.

Turning next to FIG. 2, an illustration of data flow for configuring elements in a phased array antenna is depicted in the form of a block diagram in accordance with an illustrative embodiment. In this depicted example, phased array antenna optimizer 108 may be implemented in software, hardware, firmware or a combination thereof.

When software is used, the operations performed by phased array antenna optimizer 108 may be implemented in program code configured to run on a processor unit. When firmware is used, the operations performed by phased array antenna optimizer 108 may be implemented in program code and data and stored in persistent memory to run on a processor unit. When hardware is employed, the hardware may include circuits that operate to perform the operations in phased array antenna optimizer 108.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In particular, phased array antenna optimizer 108 may be implemented in computer system 200. Computer system 200 is a group of computers.

As depicted, phased array antenna optimizer 108 is configured to optimize configuration 110 of elements 114 to use radiation pattern 116 in which configuration 110 is based on predicted future health state 124 for elements 114 taking into account a potential degradation of the group of elements 114 shown in block form in FIG. 1. The potential degradation may include a failure of one or more of elements 114 in the group, as well as one or more of elements 114 in the group performing at a level that is below the desired level.

In the illustrative example, phased array antenna optimizer 108 receives predicted future health state 124 as an input to process 202 in phased array antenna optimizer 108. As depicted, process 202 identifies configuration 110 for elements 114. In this illustrative example, process 202 includes cost function 204 and optimization function 205. As depicted, optimization function 205 is used to evaluate cost function 204.

With process 202, phased array antenna optimizer 108 is configured to optimize configuration 110 of elements 114 to use radiation pattern 116 based on predicted future health state 124 for elements 114 while taking into account potential degradation 122 of the group of elements 114 using cost function 204. For example, in optimizing configuration 110, phased array antenna optimizer 108 takes into account a combination of potential degradations that may occur in the group of elements 114.

In other words, cost function 204 may be selected to take into account different combinations for potential degradations for the group of elements. For example, the group of elements 114 may be three elements: element 1, element 2, and element 3. Cost function 204 may then take into account a degradation of element 1, element 2, element 3; element 1 and element 2; element 1 and element 3; element 2 and element 3, and other combinations of degradation of the three elements.

Cost function 204 may be selected from various cost functions. For example, cost function 204 may be selected from one of a maximum side lobe level, an average side lobe level, a cumulative difference, a beam width, a pointing accuracy, or some other characteristics of radiation pattern 116. These and other cost functions may be implemented to take into account combinations of degradations that may be possible in potential degradation 122.

As depicted, optimization function 205 is implemented using particle swarm optimization (PSO) 206. In the illustrative example, particle swarm optimization 206 is a generic optimization approach to iteratively improve the current best solution to cost function 204 with regard to a given metric and has been used extensively for optimizing phased array antennas. The basic concept is that there is a swarm of particles where each is a possible solution, such as a potential configuration for elements 114.

These particles move through the solution space based on their own local observations and also the best known position of the swarm in the overall search-space. This technique allows it to be guided to regions of known good quality while still allowing particles to explore unknown regions in search of better solutions. In practice, as the algorithm progresses, the particles will move toward near-optimal solutions.

In the illustrative example, particle swarm optimization 206 uses predicted future health state 124 in identifying configuration 110 for elements 114. Additionally, particle swarm optimization 206 may also take into account current health state 126 to identify configuration 110. In other words, phased array antenna optimizer 108 optimizes configuration 110 of elements 114 based on both current health state 126 and predicted future health state 124 for elements 114 taking into account potential degradation 122 of the group of elements 114 using cost function 204. This combination of optimization using both current health state 126 and predicted future health state 124 may leverage not only the current state of health of elements 114 but also take into account potential future states of health for elements 114.

In the illustrative example, phased array antenna optimizer 108 is configured to generate data structure 112 containing configuration 110 for elements 114 to use radiation pattern 116 based on predicted future health state 124 for elements 114 taking into account potential degradation 122 of a group of elements 114 in predicted future health state 124 and to send data structure 112 to controller 118 in FIG. 1 for phased array antenna 102.

In this illustrative example, configuration 110 includes parameters 208. As depicted, parameters 208 comprise amplitudes 210 and phases 212 for respective electrical signals being received at or sent from the different ones of elements 114.

With setting parameters 208 for elements 114, elements 114 may use radiation pattern 116 with a desired pattern. With configuration 110, radiation pattern 116 is optimized with respect to at least one of maximum side lobe level, a width for the main lobe, an average side lobe level, a cumulative difference, or some other characteristic of radiation pattern 116 taking into account potential degradation 122 of a group of elements 114 that may potentially occur based on predicted future health state 124 for elements 114. These criteria may be used for optimizing cost function 204 when evaluated by particle swarm optimization 206.

Further, configuration 110 may be one configuration in configurations 214. All of the configurations 214 may be based on predicted future health states 216. Predicted future health states 216 may be for different periods of time 218 during which elements 114 may be used.

In one illustrative example, configuration 110 is identified for elements 114 for use in performing mission 106 during period of time 220 in different periods of time 218. In this depicted example, period of time 220 is a time during which phased array antenna 102 is expected to be used. For example, period of time 220 may be one hour, 24 hours, two weeks, or some other suitable amount of time. Period of time 220 is the expected amount of time needed to perform mission 106. As depicted, other times in different periods of time 218 may occur based on the duration or amount of time for mission 106.

Each of configurations 214 is based on predicted future health state 124 for the particular one of different periods of time 218. For example, configuration 110 in configurations 214 is based on predicted future health state 124 in predicted future health states 216 for period of time 220 in different periods of time 218.

Use of elements 114 over different periods of time 218 may result in different ones or numbers of elements degrading in performance. In other words, predicted future health state 124 may be different from others of predicted future health states 216 for different time periods in different periods of time 218.

For example, a mission may be expected to last 16 hours. Period of time 220 for configuration 110 is 16 hours for this example. Configuration 222 may be generated in case the mission lasts longer than 16 hours. For example, if the mission is extended to 48 hours, configuration 222 for period of time 220 that is 48 hours may be used. Configuration 110 is based on predicted future health state 124 for period of time 220, and configuration 222 is based on future health state 226 in predicted future health states 216 for period of time 224 in different periods of time 218.

In this manner, different ones of configurations 214 may be identified for different ones of different periods of time 218. Configurations 214 may be sent to phased array antenna 102 in case mission 106 changes during performance of mission 106.

Also, if the duration of mission 106 changes, the time for mission 106 is not exactly a match for one of different periods of time 218 to identify one of configurations 214 for use in operating elements 114. For example, the period of time selected in different periods of time 218 may be one that is equal to or greater than the duration of mission 106.

The illustration of phased array antenna environment 100 and the different components in the environment in FIGS. 1-2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a prediction process may be implemented in phased array antenna optimizer 108 that predicts predicted future health state 124 for elements 114. In another illustrative example, one or more optimization processes may be used in addition to or in place of particle swarm optimization 206 in FIG. 2. For example, a genetic algorithm, a simulated annealing algorithm, and other suitable algorithms may be used.

Figure 3:
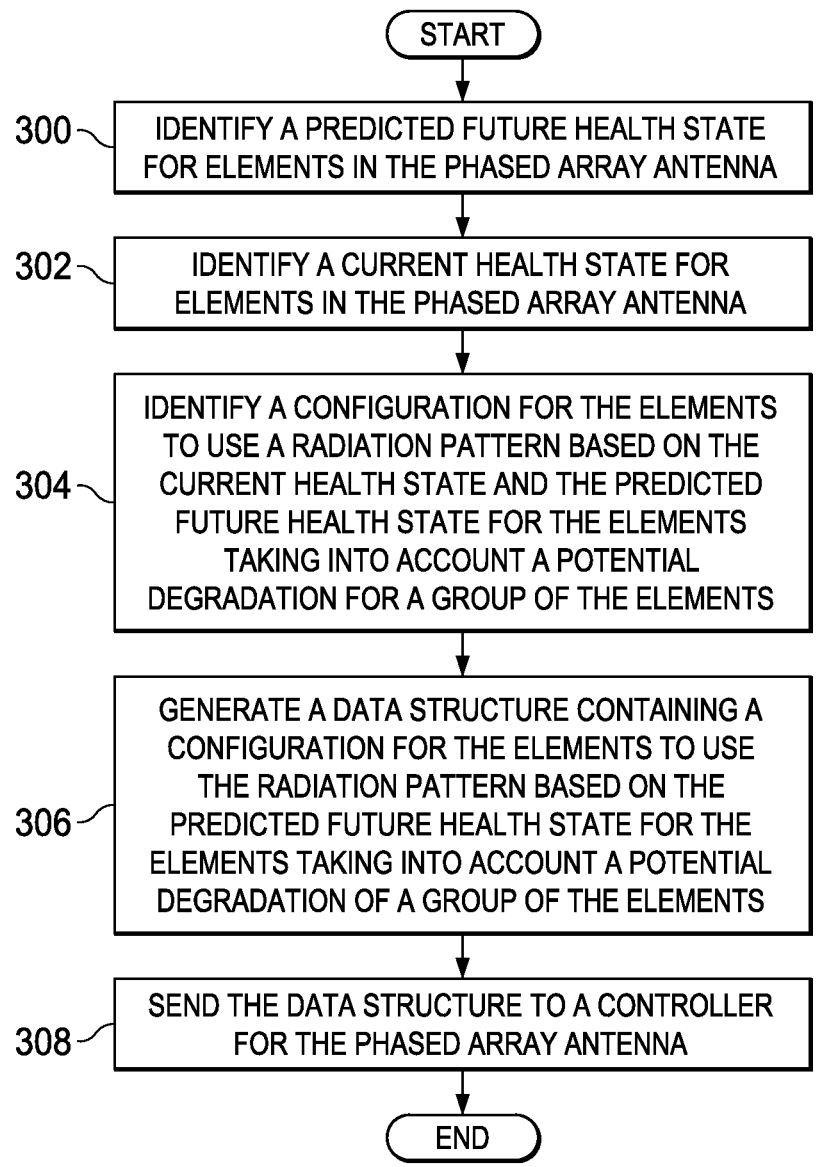
FIG. 3 is an illustration of a flowchart of a process for optimizing a phased array antenna in accordance with an illustrative embodiment.

With reference now to FIG. 3, an illustration of a flowchart of a process for optimizing a phased array antenna is depicted in accordance with an illustrative embodiment. The process illustrated in FIG. 3 may be implemented in phased array antenna environment 100 in FIG. 1. In particular, the process may be implemented in phased array antenna optimizer 108 to generate configuration 110 for use by elements 114 in phased array antenna 102.

The process begins by identifying a predicted future health state for elements in the phased array antenna (operation 300). The process identifies a current health state for elements in the phased array antenna (operation 302). The process identifies a configuration for the elements to use a radiation pattern based on the current health state and the predicted future health state for the elements taking into account a potential degradation for a group of the elements (operation 304).

In the illustrative example, operation 304 may be performed by optimizing a configuration of the elements to use the radiation pattern based on the predicted future health state for the elements taking into account a potential degradation of the group of elements. The organization is formed using a technique such as particle swarm optimization 206 in FIG. 2

The process then generates a data structure containing a configuration for the elements to use the radiation pattern based on the predicted future health state for the elements taking into account a potential degradation of a group of the elements (operation 306). The process then sends the data structure to a controller for the phased array antenna (operation 308), with the process terminating thereafter.

Figure 4:
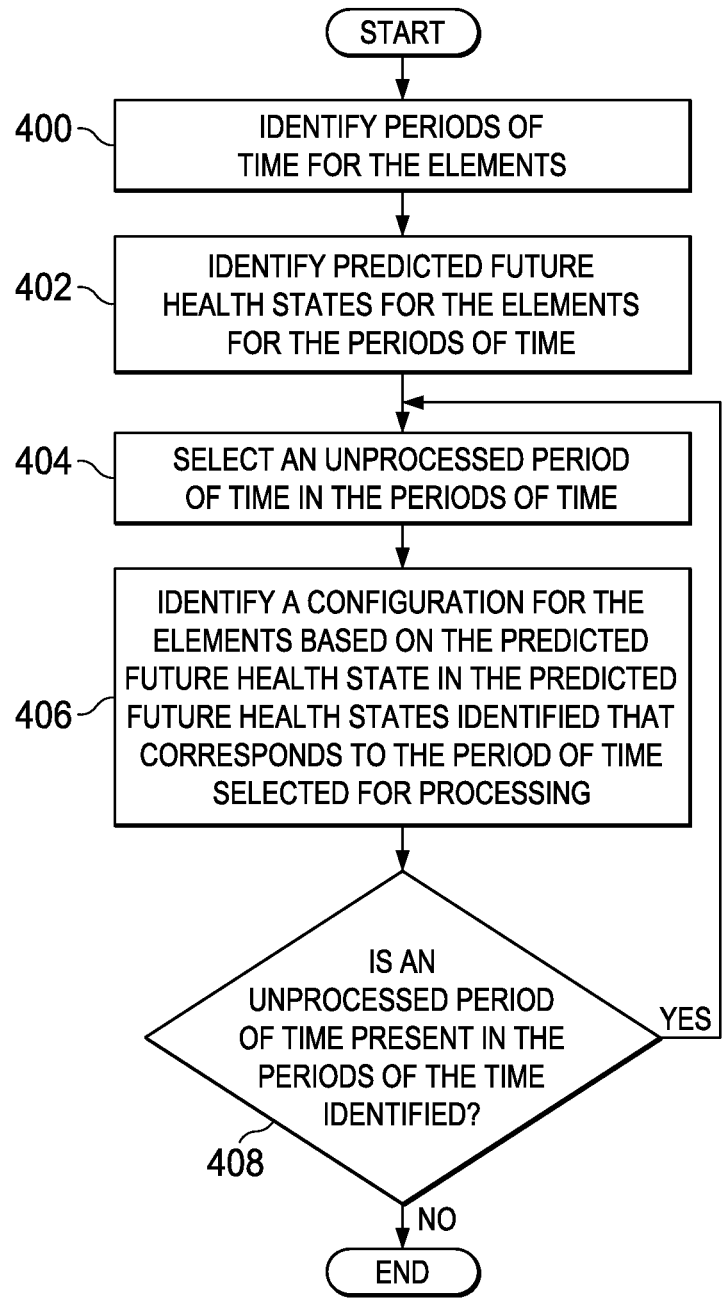
FIG. 4 is an illustration of a flowchart of a process for generating configurations for elements in a phased array antenna in accordance with an illustrative embodiment.

Turning next to FIG. 4, an illustration of a flowchart of a process for generating configurations for elements in a phased array antenna is depicted in accordance with an illustrative embodiment. The process illustrated in FIG. 4 may be implemented in phased array antenna environment 100 in FIG. 1. In particular, the process may be implemented in phased array antenna optimizer 108.

The process begins by identifying periods of time for the elements (operation 400). The periods of time are ones during which the elements may be used. The periods of time may be ones that are potentially expected during the performance of a mission. In other examples, the periods of time may be selected as incremental periods of time that may be linear, logarithmic or in some other manner.

Next, the process identifies predicted future health states for the elements for the periods of time (operation 402). In operation 402, each period of time will have a corresponding predicted future health state for the elements.

The process then selects an unprocessed period of time in the periods of time (operation 404). The process identifies a configuration for the elements based on the predicted future health state in the predicted future health states identified that corresponds to the period of time selected for processing (operation 406).

A determination is made as to whether an unprocessed period of time is present in the periods of time identified (operation 408). If an unprocessed period of time is present, the process returns to operation 404. Otherwise, the process terminates. As a result, the process in FIG. 4 generates configurations that may be used to configure elements in a phased array antenna based on the duration of a mission.

Figure 5:
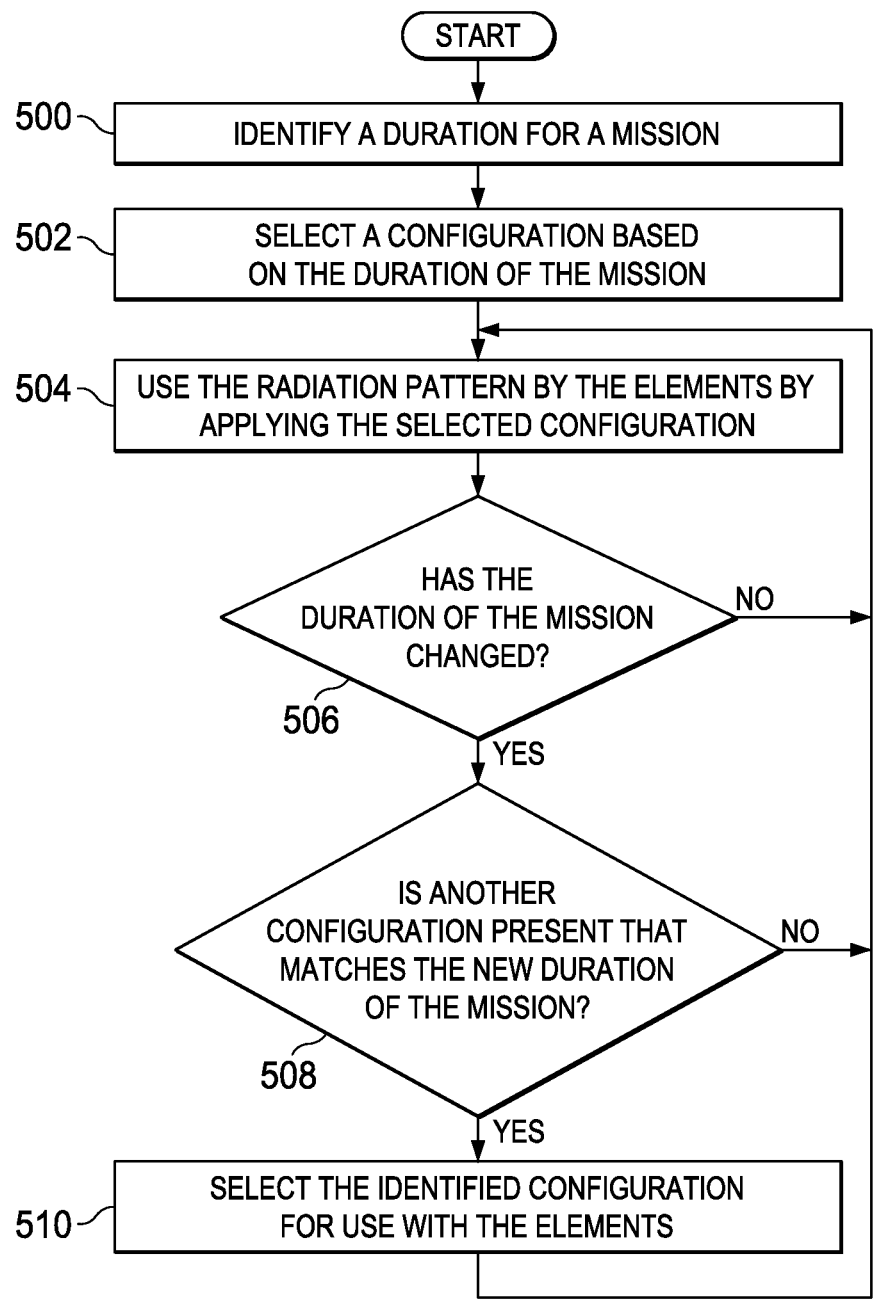
FIG. 5 is an illustration of a flowchart of a process for operating a phased array antenna on a platform in accordance with an illustrative embodiment.

With reference next to FIG. 5, an illustration of a flowchart of a process for operating a phased array antenna on a platform is depicted in accordance with an illustrative embodiment. The process illustrated in FIG. 5 may be implemented in platform 104 in FIG. 1. In particular, the process may be performed using controller 118.

The process begins by identifying a duration for a mission (operation 500). Next, a configuration is selected based on the duration of the mission (operation 502). The radiation pattern is used by the elements by applying the selected configuration (operation 504). In operation 504, the radiation pattern used by the elements occurs based on how the electrical signals are sent to the elements to generate a radiation pattern. In this manner, the elements are configured to generate the radiation pattern in a desired manner.

A determination is made as to whether the duration of the mission has changed (operation 506). If the duration of the mission has not changed, the process returns to operation 504.

On the other hand, if the duration of the mission has changed, the process determines whether another configuration is present that matches the new duration of the mission (operation 508). In these illustrative examples, another configuration may match the new duration of the mission if the configuration is generated based on a predicted future health state for the elements for a period of time that is equal to or greater than the duration of the mission.

For example, prior to the mission, a configuration may be generated for the planned duration of the mission along with a group of configurations for long durations of the mission. The process, in this example, picks the configuration with the shortest time period which is at least as long as the duration of the mission.

If another configuration is identified, the process then selects the identified configuration for use with the elements (operation 510) with the process then returning to operation 504. If another configuration is not identified, the process also returns to operation 504.

Figure 6:
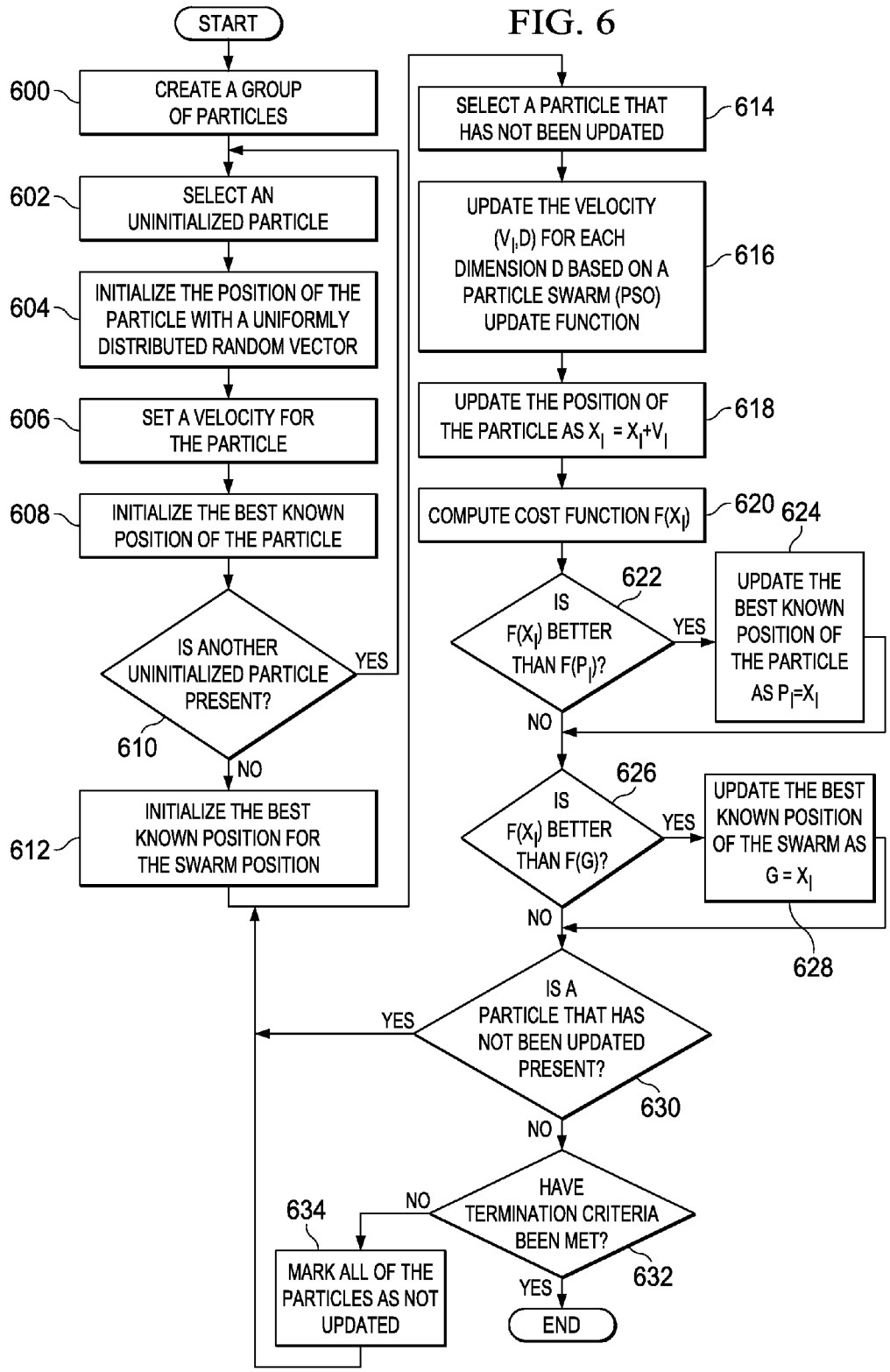
FIG. 6 is an illustration of a flowchart of a process for optimizing a configuration for elements in a phased array antenna using a particle swarm optimization in accordance with an illustrative embodiment.

With reference next to FIG. 6, an illustration of a flowchart of a process for optimizing a configuration for elements in a phased array antenna using a particle swarm optimization is depicted in accordance with an illustrative embodiment. The process illustrated in FIG. 6 may be implemented in phased array antenna optimizer 108 in FIG. 1.

The process begins by creating a group of particles (operation 600). In the illustrative example, each particle is a potential configuration for all the elements. The configuration may take into account a potential degradation of the elements by reducing values for magnitude and phase as needed. Elements that have degraded to the point of failure may have a magnitude of 0.

The process then selects an uninitialized particle (operation 602). The process initializes the position of the particle with a uniformly distributed random vector (operation 604). In operation 604, the vector is $x_i=U(b_{low},b_{up})$, wherein where b defines the search space, $b_{low}$ is the lower bound and $b_{up}$ is the upper bound in the search space. In this example, i is an index for the current particle being initialized.

The process then sets a velocity for the particle (operation 606). The velocity in this example is set as $v_i=U(-|b_{up}-b_{low}|, |b_{up}-b_{low}|)$. The process then initializes the best known position of the particle (operation 608). The best know position may be $p_i$ that is set as the initial position $x_i$ of the particle.

A determination is made as to whether another uninitialized particle is present (operation 610). If another uninitialized particle is present, the process returns to operation 602. Otherwise, the process initializes the best known position for the swarm position (operation 612). The best know position for the swarm is called g, and is initially the best of $p_i$ values which were generated.

The process then selects a particle that has not been updated (operation 614). The process updates the velocity $(v_i,d)$ for each dimension d based on a particle swarm (PSO) update function (operation 616). The process then updates the position of the particle as $x_i=x_i+v_i$ (operation 618).

The process computes cost function $f(x_i)$ (operation 620). In this illustrative example, the cost function $f(x_i)$ is defined as:

$$f-\text{robust}(x_i, P) = \sqrt[|P|+1]{f(x_i) * \prod_{p \in P} f(x_i, x_p = 0)}.$$

This cost function computes the cost under the current health state, $f(x_i)$, and under each predicted future health state $f(x_i, x_p=0)$, under the assumption of a single future failure. This function then combines these results using the geometric mean.

In other examples, other approaches may be used to combine the results. For example, arithmetic mean that takes an average of the costs, weighted combination of the current health state and the average of predicted future health states, or other suitable approaches may be used where the failures consist of combinations of future failures.

In this example, the geometric mean more heavily weights bad instances than the other approaches. For example, assume element 3, element 4, element 6, and element 7 have failed in the elements. In this example, a potential future failure of element 5, element 20, and element 30 are considered.

If all 3 of these elements degrade evenly, the type of cost function selected is not as important. However, if element 20 or element 30 fails, the performance may degrade by a small amount but a failure of element 5 could severely impact performance because element 3, element 4, element 6, and element 7 have already failed. A loss of element 5 creates a large clustered failure. In the depicted example, a large clustered failure occurs when no radiation is transmitted from five consecutive elements.

This illustrative example is more concerned with worst-case failures than average-case because if the worst-case failure occurs, the configuration may not meet mission specifications, whereas in the average case potential failure, the configuration may meet the mission specifications. Thus, using a geometric mean may ensure that if that worst case failure happens, a radiation pattern generated by the elements will still meet specifications for the mission.

A determination is made as to whether $f(x_i)$ is better than $f(p_i)$ (operation 622). If $f(x_i)$ is better than $f(p_i)$, the process updates the best know position of the particle as $p_i = x_i$ (operation 624). Otherwise, the process proceeds to operation 626. A determination is then made as to whether $f(x_i)$ is better than $f(g)$ (operation 626). If $f(x_i)$ is better than $f(g)$, the process updates best known position of the swarm as $g = x_i$ (operation 628). Otherwise, the process proceeds to operation 630.

A determination is made as to whether a particle that has not been updated is present (operation 630). If an un-updated particle is present, the process returns to operation 614. Otherwise, a determination is made as to whether termination criteria have been met (operation 632). If the termination criteria have not been met, the process marks all of the particles as not updated (operation 634) and the process returns to operation 614 to begin updating positions. If the termination criteria have been met, the process terminates, with g having the best solution.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 302 may be omitted and operation 304 may identify the configuration based on the predicted future health state without the current health state. In another example, operation 302 may be performed before operation 300 or operation 300 and operation 302 may be performed concurrently.

With an illustrative example, the radiation pattern generated by the elements using a predicted future health state may not be as great a performance as one based on the current health state. However, this radiation pattern generated using the predicted future health state is selected to provide a desired level of performance for the elements in case the elements predicted to degrade actually degrade during operation of the phased array antenna. Use of a configuration based on the current health state may provide a high level of performance, however, this configuration may result in a level of performance that does not meet some minimum threshold if elements degrade during operation of the phased array antenna.

As a result, the illustrative examples described above as well as other illustrative examples provide an ability to perform a mission even with elements degrading during the mission. In this manner, the mission may be completed using a configuration based on the predicted future health state rather than the current health state of the elements in the phased array antenna.

Figure 7:
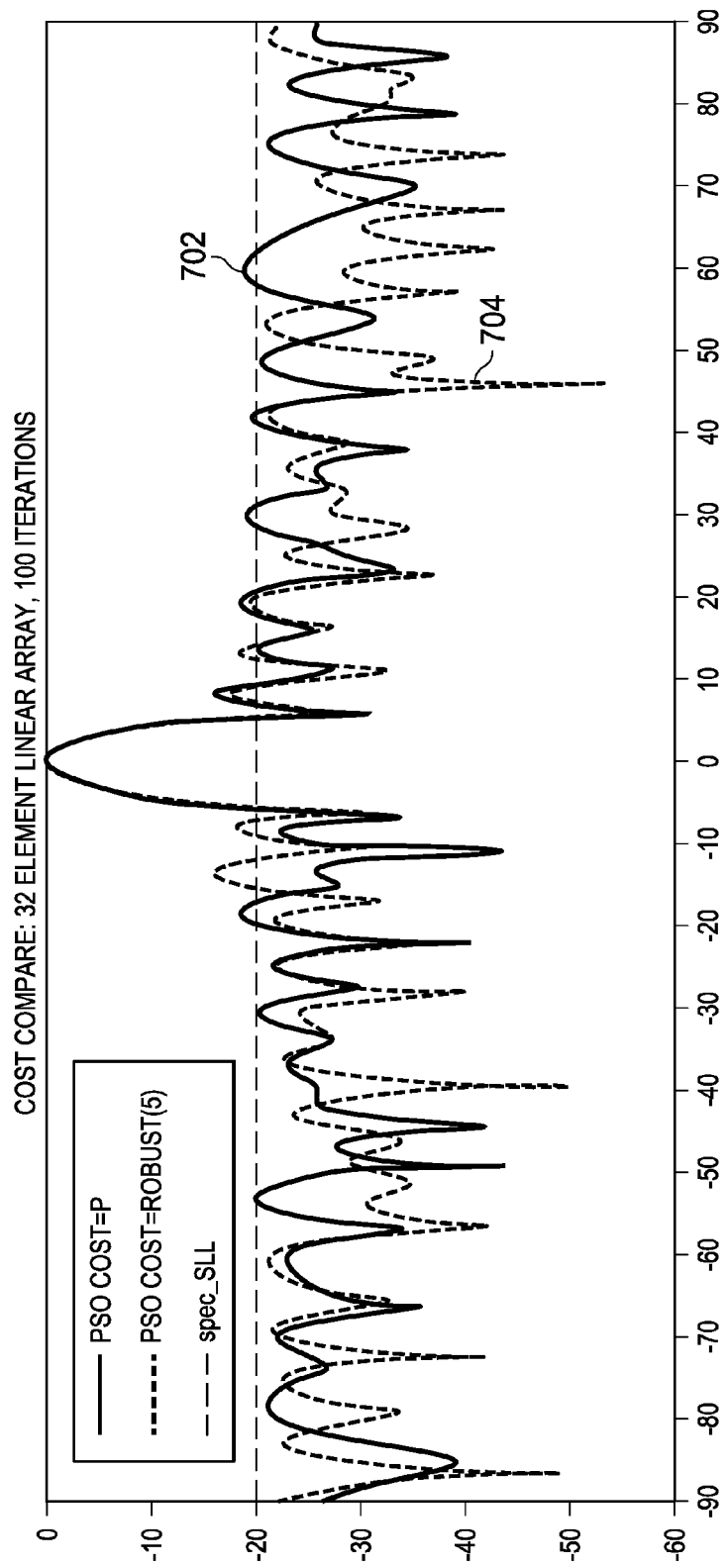
FIG. 7 is an illustration of radiation patterns generated by a phased array antenna with an array of 32 elements in accordance with an illustrative embodiment.

Turning now to FIG. 7, an illustration of radiation patterns generated by a phased array antenna with an array of 32 elements is depicted in accordance with an illustrative embodiment. Radiation patterns generated by a phased array antenna with 32 elements are depicted in line 702 and line 704.

In this illustrative example, optimizations are performed to minimize peak side lobes. Line 702 represents an optimization performed using a current health state for the elements. Line 704 represents an optimization based on the future health state in which element 5 fails. In this example, element 5 does not fail.

As can be seen, the optimization performed using the current health state in line 702 provides improved minimization of peak side lobes as compared to the optimization using the future health state in line 704. However, the performance of the elements using the optimization taking into account the future health state provides sufficient performance with respect to peak side lobes, although the performance is not as good as when using the current health state.

Figure 8:
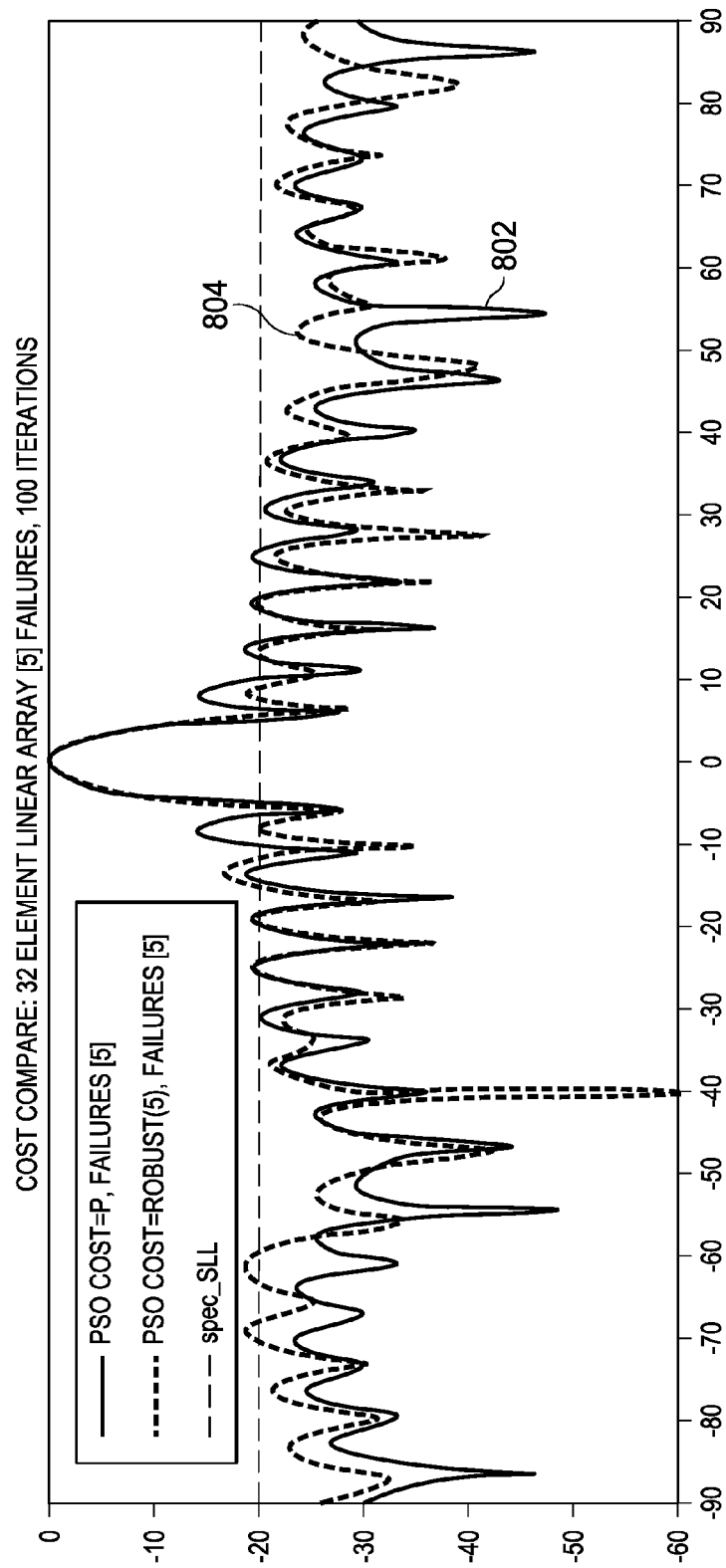
FIG. 8 is another illustration of radiation patterns generated by a phased array antenna with an array of 32 elements in accordance with an illustrative embodiment.

However, this type of optimization using the future health state provides a desired level of performance when a failure does occur during use of the elements. With reference next to FIG. 8, another illustration of radiation patterns generated by a phased array antenna with an array of 32 elements is depicted in accordance with an illustrative embodiment. Radiation patterns generated by a phased array antenna with 32 elements are depicted in line 802 and line 804. In this illustrative example, the optimization of the configuration for the elements was performed to minimize the peaks of side lobes around the main lobe.

Line 802 represents an optimization performed using a current health state for the elements. Line 804 represents an optimization based on the future health state in which element 5 fails.

In this illustrative example, a failure of element 5 occurs. The optimization based on the future health state in line 804 maintains lower peak side lobe than the optimization based on the current health state in line 802.

Thus, the illustrative embodiments provide a method and apparatus for managing the elements in phased array antennas and, in particular, in selecting configurations for the manner in which elements in a phased array antenna transmit to form a radiation pattern. As described above, one or more illustrative embodiments provide a preemptive optimization process that takes into account future health states that are predicted for the elements. These future health states may be used alone or in combination with current health of the elements to select a configuration for the elements when transmitting signals to form a radiation pattern.

Figure 9:
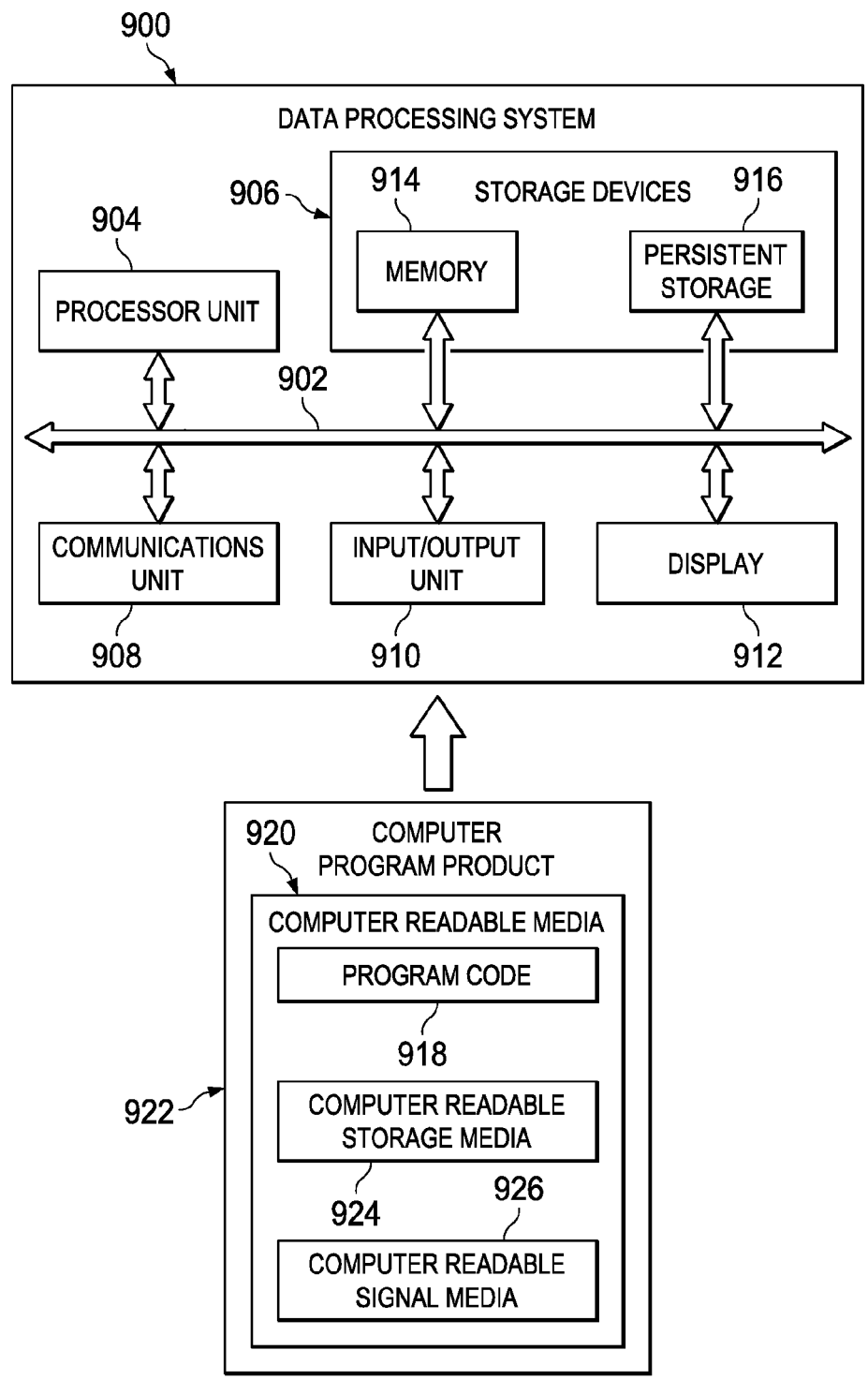
FIG. 9 is an illustration of a data processing system in the form of a block diagram in an illustrative embodiment.

Turning now to FIG. 9, an illustration of a data processing system in the form of a block diagram is depicted in an illustrative embodiment. Data processing system 900 may be used to implement controller 118 in FIG. 1, phased array antenna optimizer 108 in FIG. 1, or one or more computers in computer system 200 in FIG. 2. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multiprocessor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In this illustrative example, computer readable media 920 may be computer readable storage media 924 or computer readable signal media 926.

Computer readable storage media 924 is a physical or tangible storage device used to store program code 918 rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative embodiments may be implemented. The different illustrative embodiments may be implemented in a data processing system that includes components in addition to or in place of those illustrated for data processing system 900. Further, components shown in FIG. 9 may be varied from the illustrative examples shown.

Thus, one or more of the illustrative embodiments provide a prognostic approach to preemptive optimization for phased array antennas. In the illustrative examples, selecting parameters for elements used to generate radiation patterns such as those for beam-forming are made taking into account future health states. In these illustrative examples, the current health state in combination with the future health states may be taken into account. As a result, the increased system robustness is present in the event that elements may degrade during the performance of a mission.

This type of improved performance occurs without the need for sensors, systems to detect degradations during a mission, or resources to perform optimizations during a mission. Further, based on the optimizations performed, a decision may be made as to whether a mission should be performed based on whether radiation patterns meet desired levels when taking into account potential degradations in predicted future health states.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a phased array antenna that comprises elements;
 a phased array antenna optimizer configured to identify a predicted health state that comprises a predicted degradation, during a mission, of at least one of: a transmission of a first radiation signal, and a reception of a second radiation signal, of the elements in the phased array antenna and identify a configuration that optimizes the elements activated by a controller configured to generate a radiation pattern based on the predicted health state for the elements based upon the predicted degradation of the elements, such that the configuration is based upon a cost function based upon the predicted degradation.

2. The apparatus of claim 1, further comprising the phased array antenna optimizer configured to take into account a combination of predicted degradations of the elements.

3. The apparatus of claim 1, wherein the cost function is selected from one of a maximum side lobe level, an average side lobe level, a cumulative difference, a beam width, or a pointing accuracy.

4. The apparatus of claim 1, wherein the phased array antenna optimizer optimizes the configuration of the elements based on both a current health state and the predicted health state for the elements taking into account the predicted degradation of the elements using the cost function.

5. The apparatus of claim 1, wherein particle swarm optimization is used to evaluate the cost function.

6. The apparatus of claim 1, wherein in configuring the elements, the phased array antenna optimizer generates a data structure containing the configuration for the elements to use the radiation pattern based on the predicted health state for the elements taking into account the predicted degradation of the the elements in the predicted health state and sends the data structure to a controller for the phased array antenna.

7. The apparatus of claim 1, wherein the predicted health state is for a period of time during which the phased array antenna is expected to be in use.

8. A phased array antenna comprising:
 elements in the phased array antenna; and
 a controller configured to operate the elements to use a radiation pattern based on a predicted health state, during a mission, for the elements that comprises a predicted degradation of at least one of: a transmission of a first radiation signal, and a reception of a second radiation signal, by a group of the elements, such that the radiation pattern is based upon a cost function based upon the predicted degradation.

9. The phased array antenna of claim 8, wherein the predicted health state is for a period of time during which the phased array antenna is expected to be in use.

10. A method for optimizing a phased array antenna, the method comprising:
 identifying a predicted health state, during a mission, comprising a predicted degradation of at least one of: transmitting a first radiation signal, and receiving of a second radiation signal, via elements in the phased array antenna; and
 optimizing, using a phased array optimizer using the predicted health state and a cost function, activating, using a controller, a configuration for the elements to use a radiation pattern.

11. The method of claim 10, wherein the predicted degradation of the elements takes into account a combination of predicted degradations of the elements.

12. The method of claim 10, wherein the cost function is selected from one of a maximum side lobe level, an average side lobe level, a cumulative difference, a beam width, or a pointing accuracy.

13. The method of claim 10, wherein the configuration of the elements is optimized based on both a current health state and the predicted health state for the elements taking into account the predicted degradation of the elements using the cost function.

14. The method of claim 10, wherein particle swarm optimization is used to evaluate the cost function.

15. The method of claim 10, further comprising:
 generating a data structure containing the configuration for the elements to use the radiation pattern based on the predicted health state for the elements taking into account the predicted degradation of the elements in the predicted health state; and
 sending the data structure to a controller for the phased array antenna.

16. The method of claim 10, wherein the predicted health state is for a period of time during which the phased array antenna is expected to be in use.

* * * * *